United States Patent Office 2,978,297
Patented Apr. 4, 1961

2,978,297

PRODUCTION OF GASES CONTAINING SULFUR DIOXIDE AND OF SOLID ROASTED PRODUCTS FREE FROM ARSENIC AND ANTIMONY BY FLUIDIZED LAYER ROASTING OF MATERIALS CONTAINING ROASTABLE SULFUR IN ADDITION TO ARSENIC AND/OR ANTIMONY

Wilhelm Pfannmueller, Mannheim, and Adolf Johannsen, Herbert Wolf, and Georg Wittmann, Ludwigshafen (Rhine), Germany, assignors to Badische Anilin- & Soda-Fabrik Aktiengesellschaft, Ludwigshafen (Rhine), Germany No Drawing. Filed Nov. 26, 1957, Ser. No. 698,928

Claims priority, application Germany Dec. 7, 1956

4 Claims. (Cl. 23—178)

This invention relates to improvements in the fluidized layer roasting of materials containing roastable sulfur in addition to arsenic and/or antimony for the purpose of production of roaster gases and of cinders which are practically free from arsenic and antimony.

In the fluidized layer roasting of materials containing roastable sulfur in addition to arsenic and/or antimony, especially pyrites, for the purpose of producing gases containing sulfur dioxide with the simultaneous recovery of roasting residues practically free from arsenic and antimony, we have already made proposals, as described in U.S. Patent No. 2,889,203, to proceed by subjecting the material to be roasted in a first stage to a preliminary roasting in which roaster gases with a content of 16 to 20% by volume of sulfur dioxide and a roasted product which consists, besides the gangue, of ferrous sulfide or of ferrous sulfide in addition to ferrosoferric oxide or in addition to iron disulfide, are obtained. This roasted product is finally roasted in a second stage. Both the supply of the oxygen-containing gases necessary for the roasting for both stages and also the withdrawal of the roaster gases formed in the two stages are carried out separately and independently.

The dust-containing gases leaving the preliminary roasting stage are led in the said processes through a separator, normally a cyclone, and then purified in an electrical gas purification. The dust separated in the cyclone must be returned to the preliminary roasting stage because it still contains arsenic and/or antimony. However, if the cyclone separator is kept at a temperature of 600° C. or more, the dust separated therein is obtained in a condition so poor in arsenic and/or antimony that it can be supplied directly to the second stage for the purpose of after-roasting. In order that the dust which passes from the cyclone separator into the electrical gas purification plant and which on an average represents about 6% of the total amount of roasting material, may also be supplied directly to the after-roasting in a condition poor in arsenic and/or antimony, the electrical gas purification must be carried out at a temperature of 600° C.

It is a disadvantage of this method of operation that there is a certain coupling between the temperature of the preliminary roasting and the temperature in the electrical gas purification plant, which is occasioned by the heat radiation from the gas pipes and the cyclone separator. For example if the roasting temperature in the fluidized layer serving for the preliminary roasting is kept at 750° to 800° C., then in the usual form of construction of the apparatus the temperatures which result for the electrical gas purification plant amount to about 700° C. It is therefore necessary to use special materials for the construction of the electrical gas purification plant.

We have now found that the said disadvantage can be avoided and a decoupling of the temperature relationships in the fluidized layer and the electrical gas purification plant is possible without the dust arising from the electrical gas purification undergoing impairment in its properties necessary for roasting directly in an after-roasting stage with the formation of roasted ore practically free from arsenic and antimony. For this purpose the dust containing arsenic and/or antimony which leaves the fluidized layer is subjected with the roaster gases entraining the same to a preliminary dust removal at a temperature above 600° C., the fraction of combustible dust still contained in the roaster gases is then burnt with oxygen or oxygen-containing gases, the roaster gases thus treated are cooled in a heat-exchanger to temperatures of about 450° to 350° C. and led to an electrical gas purification at the said temperature.

The preliminary dust removal may suitably be carried out in a cyclone separator and the combustion of the fraction of combustible dust still contained in the roaster gases may suitably be carried out in a combustion chamber provided behind the cyclone separator.

In the combustion chamber, the dimensions of which are preferably kept small, the content of iron, arsenic and antimony in the dust leaving the cyclone separator is oxidized to $Fe_2O_3$, $As_2O_3$ and $Sb_2O_3$. It is advantageous to regulate the amount of oxygen or oxygen-containing gas which is introduced into the combustion chamber that the rise in temperature occasioned by the combustion achieves a maximum. The cooling of the roaster gases thus heated up may take place in a variable steam boiler provided with bypass flaps. In this way the desired temperature of about 350° to 450° C. can be set up in the electrical gas purification plant independently of the temperature in the fluidized layer and of the dust content of the roaster gases formed in the said fluidized layer.

The small dust concentration in the roaster gases leaving the cyclone separator and the short residence time of the dust in the small combustion chamber and the annexed steam boiler makes it possible to withdraw the dust in a form practically free from arsenic and antimony partly from the steam boiler and partly from the electrical gas purification plant.

The solid product practically free from arsenic and antimony formed in the fluidized layer can be finally roasted in a second fluidized layer by means of freshly supplied oxygen-containing gases.

The following example will further illustrate this invention but the invention is not restricted to this example.

*Example*

3,000 Nm.³ per hour of roaster gas which has been formed in the fluidized layer serving for the preliminary roasting of pyrites containing arsenic and antimony, and which contains about 20% by volume of sulfur dioxide, are led through a cyclone separator which is kept at 650° C. After dust removal in the cyclone, the roaster gases at 650° C. still contain 15.2 grams of dust with 30.4% of sulfur combined as sulfide, 1.8 grams of arsenic and 0.39 gram of antimony per cubic metre. These roaster gases are supplied together with 330 Nm.³ of air per hour to a combustion chamber in which a temperature of 740° C. is maintained by combustion of the combustible portion of the dust. The roaster gases having this temperature are then led through a steam boiler in which they are cooled to about 400° C. The gases thus cooled are subjected to a purification in an electrical gas purification plant. In the steam boiler and in the electrical gas purification plant there are deposited 142 kilograms of dust per hour. 3,300 Nm.³ of roaster gases with a content of 19.3% by volume of sulfur dioxide leave the electrical gas purification plant each hour.

A process for roasting iron pyrites has become known from U.S. patent specification No. 2,637,629 according to which the roasting is carried out in stages in fluidized layers and a combustion chamber and a heat exchanger are provided behind the first fluidized layer. The process according to the present invention differs fundamentally from the said prior process in that in the latter a distillation of free sulfur with partial oxidation of the iron pyrites takes place in the first fluidized layer, the partially oxidized material is then substantially completely roasted in a second fluidized layer and then in a third fluidized layer the last portion of sulfur in the roasted material is burnt. The conception underlying the present invention plays no part therein because the gases containing sulfur dioxide leaving the combustion chamber in the said prior process are not subjected to any purification and withdrawn from the process but are led together with the roasted material from the first fluidized layer into the next fluidized layer.

We claim:

1. In a two-stage process of roasting ferrous material containing roastable sulfur and at least one of the elements arsenic and antimony, wherein said material is partly roasted in a first fluidized layer and said arsenic and antimony are removed in the roaster gases therefrom together with entrained dust also containing iron as partly roasted ferrous material, and roasting of the partly roasted residue substantially free of arsenic and antimony is completed in a second fluidized layer, the improvement for recovering said dust in a form substantially free of arsenic and antimony which comprises: removing a portion of said dust from said roaster gases in a dust separator at a temperature above 600° C., whereby said removed dust is substantially free of arsenic and antimony; burning the roaster gas effluent from said separator which contains said arsenic and antimony and the remaining portions of entrained iron-containing dust with a sufficient amount of free oxygen-containing gas to oxidize the iron, arsenic and antimony content of said effluent respectively to $Fe_2O_3$, $As_2O_3$ and $Sb_2O_3$; cooling the combustion product containing said oxides to about 350° C. to 450° C. by indirect heat exchange, and precipitating $Fe_2O_3$ dust substantially free of arsenic and antimony from said combustion product by electrical gas purification at about 350° C. to 450° C.

2. The process defined in claim 1 wherein said first-removed dust portion is conveyed to said second fluidized layer for completion of roasting.

3. The process defined in claim 1 wherein said ferrous material is iron pyrites.

4. The process defined in claim 1 wherein a cyclone separator is employed as said dust separator, and the hot roaster gas effluent therefrom is discharged directly into a combustion chamber for said burning.

References Cited in the file of this patent

UNITED STATES PATENTS

| | | |
|---|---|---|
| 1,509,688 | Parsons et al. | Sept. 23, 1924 |
| 2,013,753 | Hahn | Sept. 10, 1935 |
| 2,867,526 | Heath et al. | Jan. 6, 1959 |